US00RE45658E

(19) United States
(12) Reissued Patent
Schroers et al.

(10) Patent Number: US RE45,658 E
(45) Date of Reissued Patent: Aug. 25, 2015

(54) METHOD OF MANUFACTURING AMORPHOUS METALLIC FOAM

(75) Inventors: Jan Schroers, Hamden, CT (US); William L. Johnson, Pasadena, CA (US); Christopher Thomas Veazey, Beaverton, OR (US); Marios D. Demetriou, Los Angeles, CA (US)

(73) Assignees: Crucible Intellectual Property, LLC, Dana Point, CA (US); California Institute of Technology, Pasadena, CA (US)

(21) Appl. No.: 13/303,844

(22) Filed: Nov. 23, 2011

Related U.S. Patent Documents

Reissue of:
(64) Patent No.: 7,621,314
Issued: Nov. 24, 2009
Appl. No.: 10/542,438
PCT Filed: Jan. 20, 2004
PCT No.: PCT/US2004/001575
§ 371 (c)(1),
(2), (4) Date: May 2, 2006
PCT Pub. No.: WO2004/076099
PCT Pub. Date: Sep. 10, 2004

(51) Int. Cl.
*B22D 27/00* (2006.01)
*B22D 27/13* (2006.01)

(52) U.S. Cl.
CPC ..... *B22D 27/13* (2013.01)

(58) Field of Classification Search
USPC ..... 164/79; 148/403
See application file for complete search history.

(56) References Cited

U.S. PATENT DOCUMENTS 2,106,744 A 2/1938 Hood et al.
2,190,611 A 2/1940 Sembdner
2,215,039 A 9/1940 Hood et al.
2,221,709 A 11/1940 Hood et al.
2,286,275 A 6/1942 Hood et al.
2,755,237 A 7/1956 Turner
3,434,827 A 3/1969 Lemkey
3,594,292 A 7/1971 Russell et al.
3,615,900 A 10/1971 Lee
3,773,098 A 11/1973 Rock
3,775,176 A 11/1973 Cross et al.
4,099,961 A * 7/1978 Patten ..... 75/415
4,115,682 A 9/1978 Kavesh et al.
4,289,009 A 9/1981 Festag et al.
4,472,955 A 9/1984 Nakamura et al.
4,621,031 A 11/1986 Scruggs
4,710,235 A 12/1987 Scruggs
4,713,277 A * 12/1987 Akiyama et al. ..... 428/131
4,854,370 A 8/1989 Nakamura
4,990,198 A 2/1991 Masumoto et al.

(Continued)

FOREIGN PATENT DOCUMENTS

GB 2075551 A 11/1981
GB 223625 A 4/1991

(Continued)

OTHER PUBLICATIONS

Lyman et al., Metals Handbook, Forging and Casting, 8th ed., 1970, vol. 5, pp. 285-291 and 300-306.

(Continued)

*Primary Examiner* — Kevin P Kerns
(74) *Attorney, Agent, or Firm* — Brownstein Hyatt Farber Schreck, LLP

(57) ABSTRACT

Metallic foams comprising high viscosity materials and apparatuses and methods of manufacturing such foams, and more particularly methods for controllably manufacturing metallic foams from bulk-solidifying amorphous alloys are provided.

29 Claims, 11 Drawing Sheets

(56) References Cited

U.S. PATENT DOCUMENTS

| | | | | |
|---|---|---|---|---|
| 5,032,196 | A | 7/1991 | Masumoto et al. | |
| 5,053,084 | A | 10/1991 | Masumoto et al. | |
| 5,053,085 | A | 10/1991 | Masumoto et al. | |
| 5,074,935 | A | 12/1991 | Masumoto et al. | |
| 5,117,894 | A | 6/1992 | Katahira | |
| 5,131,279 | A | 7/1992 | Lang et al. | |
| 5,169,282 | A | 12/1992 | Ueda et al. | |
| 5,225,004 | A | 7/1993 | O'Handley et al. | |
| 5,281,251 | A | 1/1994 | Kenny et al. | |
| 5,288,344 | A | 2/1994 | Peker et al. | |
| 5,296,059 | A | 3/1994 | Masumoto et al. | |
| 5,306,463 | A | 4/1994 | Horimura | |
| 5,312,495 | A | 5/1994 | Masumoto et al. | |
| 5,324,368 | A | 6/1994 | Masumoto et al. | |
| 5,368,659 | A | 11/1994 | Peker et al. | |
| 5,384,203 | A * | 1/1995 | Apfel | 428/613 |
| 5,390,724 | A | 2/1995 | Yamauchi et al. | |
| 5,567,251 | A | 10/1996 | Peker et al. | |
| 5,589,012 | A | 12/1996 | Hobby et al. | |
| 5,618,359 | A | 4/1997 | Lin et al. | |
| 5,711,363 | A | 1/1998 | Scruggs et al. | |
| 5,735,975 | A | 4/1998 | Lin et al. | |
| 5,865,237 | A | 2/1999 | Schorghuber et al. | |
| 6,021,840 | A | 2/2000 | Colvin | |
| 6,325,868 | B1 | 12/2001 | Kim et al. | |
| 6,408,928 | B1 | 6/2002 | Heinrich et al. | |
| 6,491,592 | B2 | 12/2002 | Cackett et al. | |
| 6,771,490 | B2 | 8/2004 | Peker et al. | |
| 6,843,496 | B2 | 1/2005 | Peker et al. | |
| 6,887,586 | B2 | 5/2005 | Peker et al. | |
| 7,017,645 | B2 * | 3/2006 | Johnson et al. | 164/113 |
| 7,073,560 | B2 * | 7/2006 | Kang et al. | 164/79 |
| 2003/0051850 | A1 | 3/2003 | Asholt et al. | |

FOREIGN PATENT DOCUMENTS

| | | | |
|---|---|---|---|
| JP | 57-109242 | | 7/1982 |
| JP | 61238423 | A | 10/1986 |
| JP | 2001303218 | | 10/2001 |

OTHER PUBLICATIONS

Eshbach et al., "Section 12—Heat Transfer", Handbook of Engineering Fundamentals, 3d ed., 1975, pp. 1113-1119.

Inoue, et al., "MG-Cu-Y Bulk Amorphous Alloys with High Tensile Strength Produced by a High-Pressure Die Casting Method", Materials Transactions, 1992, JIM, vol. 33, No. 10, pp. 937 to 945.

Inoue, et al., "Bulky La-Al-TM (TM=Transition Metal) Amorphous Alloys with High Tensile Strength Produced by a High-Pressure Die Casting Method", Materials Transactions, 1993, JIM, vol. 34, No. 4, pp. 351 to 358.

Kato et al., "Production of Bulk Amorphous $Mg_{85}Y_{10}Cu_5$ Alloy by Extrusion of Atomized Amorphous Powder", Materials Transactions, JIM, 1994, vol. 35, No. 2, pp. 125 to 129.

Kawamura et al., Full Strength Compacts by Extrusion of Glassy Metal Powder at the Supercooled Liquid State, Appl. Phys. Lett. 1995, vol. 67, No. 14, pp. 2008-2010.

Catalog Cover Entitled, Interbike Buyer Official Show Guide, 1995, 3 pages.

Polk et al., "The Effect of Oxygen Additions on the Properties of Amorphous Transition Metal Alloys", Source and date unknown, pp. 220-230.

Brochure entitled ProCAST . . . not just for castings!, UES, Inc., 1 page.

* cited by examiner

METHOD OF MANUFACTURING AMORPHOUS METALLIC FOAM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention is directed to amorphous metallic foams and novel methods of manufacturing amorphous metallic foams; and more particularly to amorphous metallic foams made from bulk-solidifying amorphous alloys and methods of manufacturing such foams.

BACKGROUND OF THE INVENTION

Metallic foams are known to have interesting combinations of physical properties. They offer high stiffness in conjunction with very low specific weight, high gas permeability, and a very high energy absorption ability. Today, these materials are emerging as a new engineering material. Foams can be classified as either open or closed porous. Whereas open foams are mainly used as functional materials such as gas permeability membranes, closed foams find application as structural materials such as energy absorbers or light-weight stiff materials.

However, the broad-use of metallic foams is hindered by the difficulty in producing uniform and consistent foam structures. Specifically, prior manufacturing methods for producing metallic foams result in an undesirably wide distribution of cell and/or pore sizes, which cannot be controlled satisfactorily, and as such limits and degrades the functional and structural characteristics of the metallic foam materials.

The conventional production of metallic foamed structures is generally carried out in the liquid state above the melting temperature of the material, though some solid state methods have also been used. The foaming of ordinary metals is challenging because a foam is an inherently unstable structure. The reason for the imperfect properties of conventional metallic foams comes from the manufacturing process itself. For example, although a pure metal or metal alloy typically consists of a large volume fraction (>50%) of gas bubbles, manufacturing metallic foam from ordinary alloys is very difficult because a desired bubble distribution can not be readily sustained for practical times in their molten state.

Specifically, the time scales for the flotation of bubbles in a foam scales with viscosity of the material. Accordingly, the mechanical properties of these foams drastically degrade with the degree of imperfection caused by the flotation and bursting of bubbles during manufacture. In addition, the low viscosity of most commonly used liquid metals results in a short time scale for manufacture, which makes the processing of metallic foam a delicate process.

In order to remedy these shortcomings, several techniques have been attempted. For example, to reduce the sedimentation flotation process, Ca particles have been added to the liquid metal. However, the addition of Ca degrades the metallic nature of base metal as well as the resultant metallic foam. Alternatively, foaming experiments have been performed under reduced gravity, in space, to reduce the driving force for flotation, however, the cost for manufacturing metallic foams in space is prohibitive.

Accordingly, a need exists for improved methods for manufacturing metallic foams and especially metallic foams of amorphous atomic structure which also can be used for the production of better-controlled foam structures.

SUMMARY OF THE INVENTION

The present invention is directed to a method of controllably manufacturing metallic foams from amorphous alloys, and more particularly to controllably manufacturing metallic foams from bulk solidifying amorphous alloys.

In one embodiment of the invention, the volume fraction of bubbles in the metallic foam can be continuously varied between >1% and ~95%. In such an embodiment, the bubble size can also be continuously varied between ~2 μm and ~4 mm on average.

In another embodiment of the invention, the amorphous alloy is a bulk-solidifying amorphous alloy, where a bulk-solidifying amorphous alloy is defined as an alloy that can be cast with a dimension of more than about 1 mm in its smallest dimension.

In another embodiment of the invention, the amorphous alloy is a bulk-solidifying amorphous alloy, where a bulk-solidifying amorphous alloy has a delta T of more than 60° C.

In yet another embodiment, the invention is directed to a method of making metallic foams comprising the steps of:

a) Making a "precursor" by introducing gas bubbles having an internal "bubble pressure" to the molten alloy at a temperature above the liquidus temperature of the alloy;
b) Cooling the bubble consisting liquid such that it maintains its amorphous state; and
c) Subsequent expansion of the precursor under a havin gradient, where the pressure during step c must be lower than the bubble pressure during step a.

In still another embodiment of the invention, the cooling step of the method entails fully solidifying the precursor into a substantially amorphous atomic structure. In such an embodiment, the solidified precursor must be reheated to around the supercooled region in the subsequent expansion step.

In still yet another embodiment of the invention, the gas bubbles are introduced to the liquid by stirring the liquid which distributes bubbles through the liquid surface.

In still yet another embodiment of the invention, the gas is introduced to the liquid through a nozzle.

In still yet another embodiment of the invention, the stirring of the liquid is used to chop up existing liquids to obtain smaller bubbles.

In still yet another embodiment of the invention, the gas bubbles are introduced to the liquid by adding an agent that releases gas at this temperatures and therefore leads to the creation of bubbles.

In still yet another embodiment of the invention, the method includes the step of introducing a volume fraction of <30% of small bubbles (between 1 μm and 1 mm) to the molten alloy liquid at or above the liquidus temperature. In such an embodiment, the bubble containing liquid is solidified and its amorphous structure is maintained to produce a foam "precursor". In such an embodiment, the foam precursor is preferably an amorphous metal alloy consisting of up to 30% bubbles with a size distribution between 1 μm and 1 mm.

In still yet another embodiment the invention is directed to a method of forming articles of amorphous metallic foams having a very narrow distribution of bubble sizes. In such an embodiment the bubbles may have a size distribution of a few gum, for example, between about 1 and 10 μm.

BRIEF DESCRIPTION OF THE DRAWINGS

These and other features and advantages of the present invention will be better understood by reference to the following detailed description when considered in conjunction with the accompanying drawings wherein:

FIG. 1 is a graphical representation of the time, temperature and transformation (TTT diagram) properties of an embodiment ($Zr_{58.5}Nb_{2.8}Cu_{15.6}Ni_{12.8}Al_{10.3}$ (% atom.) called VIT-106a) of a suitable material for manufacturing metallic foams according to the current invention. A data point showing the time that is available at a given temperature before crystallization sets in.

DETAILED DESCRIPTION OF THE INVENTION

Figure 1:
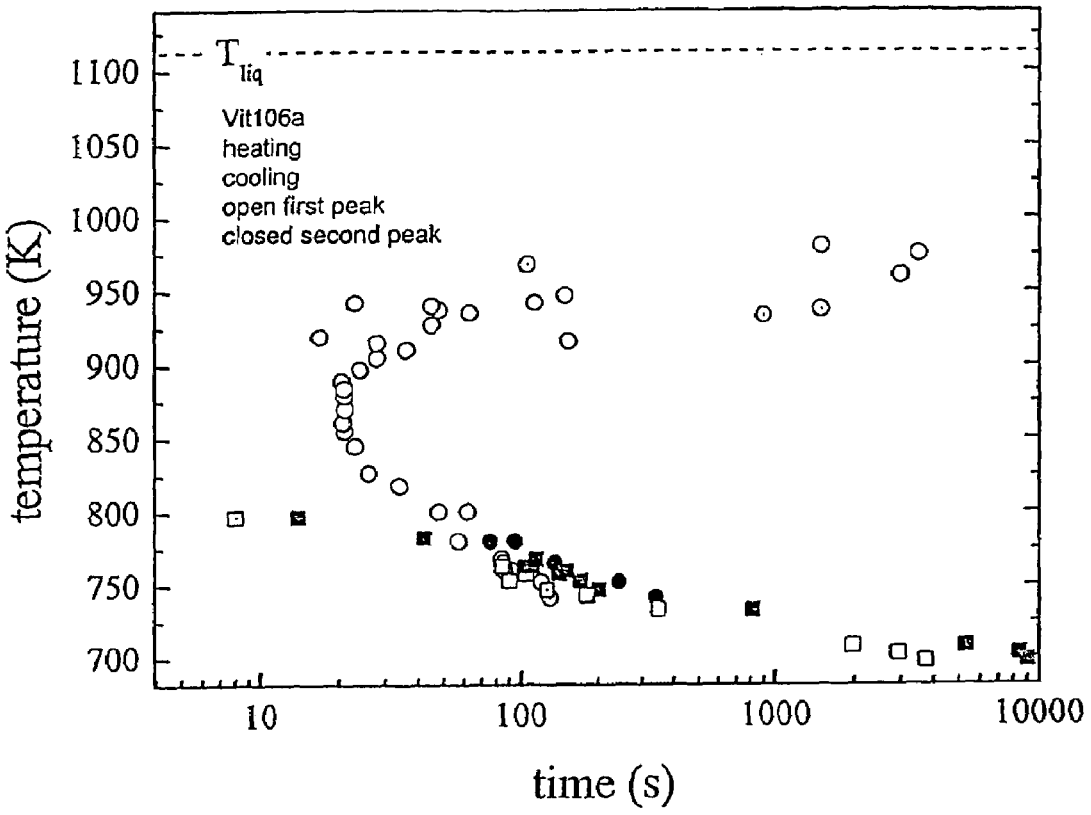

The present invention is directed to a method of controllably manufacturing metallic foams from amorphous alloys, and more particularly from bulk-solidifying amorphous alloys.

Bulk solidifying amorphous alloys (or bulk metallic glasses) are amorphous alloys (metallic glass or non-crystalline metal), which can be cooled at substantially lower cooling rates, of about 500 K/sec or less, and substantially retain their amorphous atomic structure. As such, these materials can be produced in thicknesses of 1.0 mm or more, substantially thicker than conventional amorphous alloys, which can only be formed to thickness of 0.020 mm, and which require cooling rates of $10^5$ K/sec or more. Furthermore, bulk-solidifying-amorphous alloys generally show a distinct glass transition before crystallization upon heating from the ambient temperatures. Bulk-solidifying amorphous alloys also generally show a ΔT (defined below) of larger than 30° C.

For the purposes of this invention, the term amorphous means at least 50% by volume of the alloy has an amorphous atomic structure, and preferably at least 90% by volume of the alloy has an amorphous atomic structure, and most preferably at least 99% by volume of the alloy has an amorphous atomic structure.

U.S. Pat. Nos. 5,288,344; 5,368,659; 5,618,359; and 5,735,975 (the disclosure of each of which is incorporated herein by reference in its entirety) disclose such bulk solidifying amorphous alloys. A family of bulk solidifying amorphous alloys can be described as $(Zr,Ti)_a(Ni,Cu,Fe)_b(Be,Al,Si,B)_c$, where a is in the range of from 30 to 75, b is in the range of from 5 to 60, and c in the range of from 0 to 50 in atomic percentages. Furthermore, those alloys can accommodate substantial amounts of other transition metals up to 20% atomic, and more preferably metals such as Nb, Cr, V, Co. A preferable alloy family is $(Zr,Ti)_a(Ni,Cu)_b(Be)_c$, where a is in the range of from 40 to 75, b is in the range of from 5 to 50, and c in the range of from 5 to 50 in atomic percentages. Still, a more preferable composition is $(Zr,Ti)_a(Ni,Cu)_b(Be)_c$, where a is in the range of from 45 to 65, b is in the range of from 7.5 to 35, and c in the range of from 10 to 37.5 in atomic percentages. Another preferable alloy family is $(Zr)_a(Nb,Ti)_b(Ni,Cu)_c(Al)_d$, where a is in the range of from 45 to 65, b is in the range of from 0 to 10, c is in the range of from 20 to 40 and d in the range of from 7.5 to 15 in atomic percentages.

Another set of bulk-solidifying amorphous alloys are ferrous metal (Fe, Ni, Co) based compositions. Examples of such compositions are disclosed in U.S. Pat. No. 6,325,868, (A. Inoue et. al., Appl. Phys. Lett., Volume 71, p 464 (1997)), (Shen et. al., Mater. Trans., JIM, Volume 42, p 2136 (2001)), and Japanese patent application 2000126277 (Publ. #.2001303218 A), all of which are incorporated herein by reference. One exemplary composition of such alloys is $Fe_{72}Al_5Ga_2P_{11}C_6B_4$. Another exemplary composition of such alloys is $Fe_{72}Al_7Zr_{10}Mo_5W_2B_{15}$. Although, these alloy compositions are not processable to the degree of the Zr-base alloy systems, they can be still be processed in thicknesses around 1.0 mm or more, sufficient enough to be utilized in the current invention.

Although any of the above bulk-solidifying amorphous alloys may be utilized, in one preferred embodiment the bulk-solidifying amorphous alloy has a ΔT of larger than 60° C. and preferably larger than 90° C., where ΔT defines the extent of the supercooled liquid regime above the glass transition temperature, to which the amorphous alloy can be heated without significant crystallization in a typical Differential Scanning Calorimetry experiment.

In general, crystalline precipitates in amorphous alloys are highly detrimental to their properties, especially to the toughness and strength, and as such it is generally preferred to limit these precipitates to as small a minimum volume fraction possible so that the alloy is substantially amorphous. However, there are cases in which, ductile crystalline phases precipitate in-situ during the processing of bulk amorphous alloys, which are indeed beneficial to the properties of bulk amorphous alloys especially to the toughness and ductility. The volume fraction of such beneficial (or non-detrimental) crystalline precipitates in the amorphous alloys can be substantial. Such bulk amorphous alloys comprising such beneficial precipitates are also included in the current invention. One exemplary case is disclosed in (C. C. Hays et. al, Physical Review Letters, Vol. 84, p 2901, 2000), the disclosure of which is incorporated herein by reference.

Although bulk-solidifying amorphous alloys are discussed above, it should be understood that any suitable amorphous alloy, especially ones with a $\Delta T$ of larger than 30° C., may be used in the current invention.

The amorphous alloys and specifically bulk-solidifying amorphous alloys are characterized by relatively sluggish crystallization kinetics. The sluggish crystallization kinetic makes the whole or a portion of the under-cooled liquid region, the temperature region between the liquidus temperature and the glass transition temperature, accessible for practical times, as shown in FIG. 1. For example, the time before crystallization sets in was experimentally determined, in an isothermal experiment, for the whole under-cooled liquid region and is summarized in time temperature transformation (TTT) diagrams for a few exemplary amorphous alloys ($Zr_{41}Ti_{14}Cu_{12}Ni_{10}Be_{23}$, $Zr58.5Nb_{2.8}Cu_{15.6}Ni_{12.8}Al_{10.3}$, $Pd_{43}Ni_{10}Cu_{27}P_{20}$). FIG. 1 shows the TTT diagram for $Zr_{58.5}Nb_{2.8}Cu_{15.6}Ni_{12.8}Al_{10.3}$ (VIT-106a).

Figure 2:
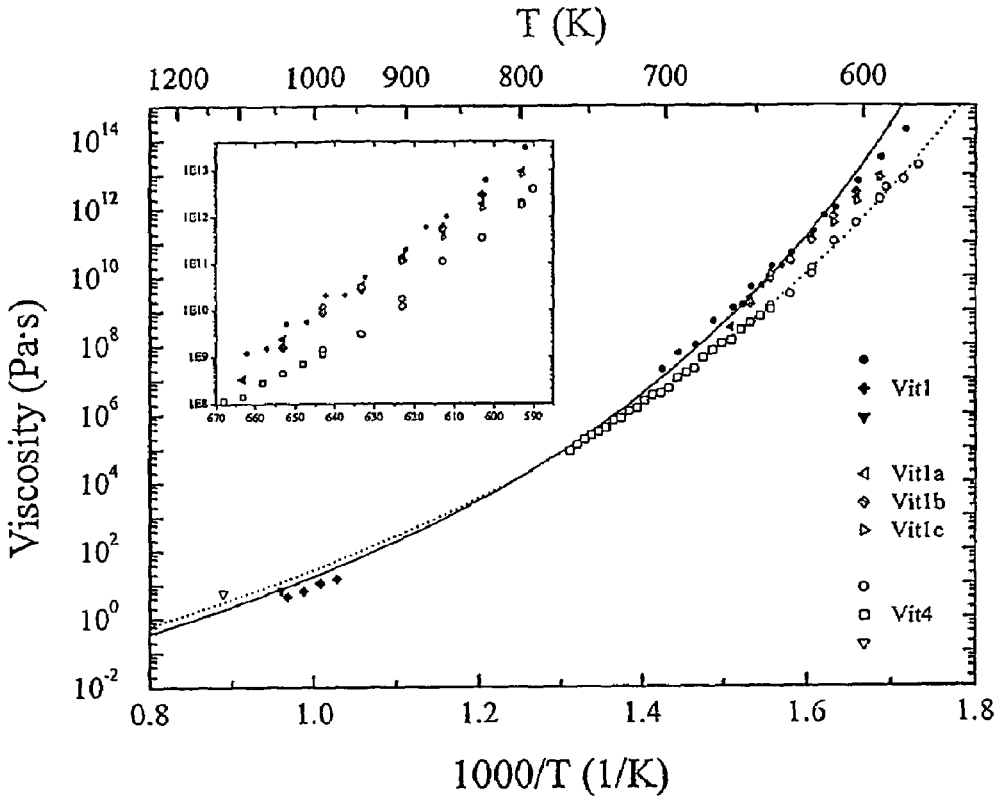
FIG. 2 is a graphical representation of the viscosity properties of an embodiment (Zr—Ti—Ni—Cu—Be VIT-1 series) of a suitable material for manufacturing amorphous metallic foams according to the current invention.

The under-cooled region is accessed by cooling from the stable liquid (circles) and by heating the solid amorphous state (squares). At low temperatures, below 750 K, no noticeable difference between the heated and cooled samples in the under-cooled liquid can be observed provided that such heating and cooling is achieved sufficiently fast to avoid any significant crystallization. Furthermore, a relatively large range of viscosity values can be observed in the under-cooled liquid regime of bulk-solidifying amorphous alloys. For example, FIG. 2 shows the viscosity as a function of temperature for $Zr_{41}Ti_{14}Cu_{12}Ni_{10}Be_{23}$ (VIT-1) As shown, the viscosity of this bulk-solidifying amorphous alloy changes by ~13 orders of magnitude in the undercooled liquid regime.

The applicants discovered that the sluggish crystallization kinetics (see FIG. 1) can be beneficially exploited to develop novel processing methods for bulk-solidifying amorphous alloy foam structures. Furthermore, the applicants discovered that utilizing these novel processing methods and by accessing a large regime of viscosity values, between ~1 Pa·s and ~$10^{13}$ Pa·s, highly homogeneous and controllable amorphous metallic foam structures can be obtained. The applicants further discovered that these novel methods of processing amorphous alloys into metallic foam structures can substantially forego or relax the dimensional limitations arising from the critical cooling rate to form an amorphous phase.

For example, it is possible to achieve in a bulk solidifying amorphous metal forming liquid a viscosity of three orders of magnitude higher than viscosities of pure metals or simple metallic alloys. This high viscosity results in a much slower foaming kinetics. Flotation of the bubbles, coarsening and collapsing scales with the viscosity. This should enable better controllability of factors such as foam homogeneity, bubbles size distribution, and volume fraction. In the supercooled liquid region of bulk-solidifying amorphous, a very high viscous state can be achieved where floatation of even centimeter size bubbles is negligible on the time scale of the experiment. Crystallization is very sluggish wherefore a very controlled expansion condition of the foam can be established in amorphous metal a technique unusable for conventional metallic alloys.

From both a processing point of view and from a materials property view bulk solidifying amorphous metal are ideal for foam production. For example, the high strength of the amorphous alloys is bereficia Nor high strength to weight foams, and the very high elastic energy absorption can be used to make an elastic energy storage foam. The current method also makes it possible to produce metallic foams wherein the volume fraction of bubble can be varied almost in a continuous manner to tailor specific foam properties.

Figure 3A:
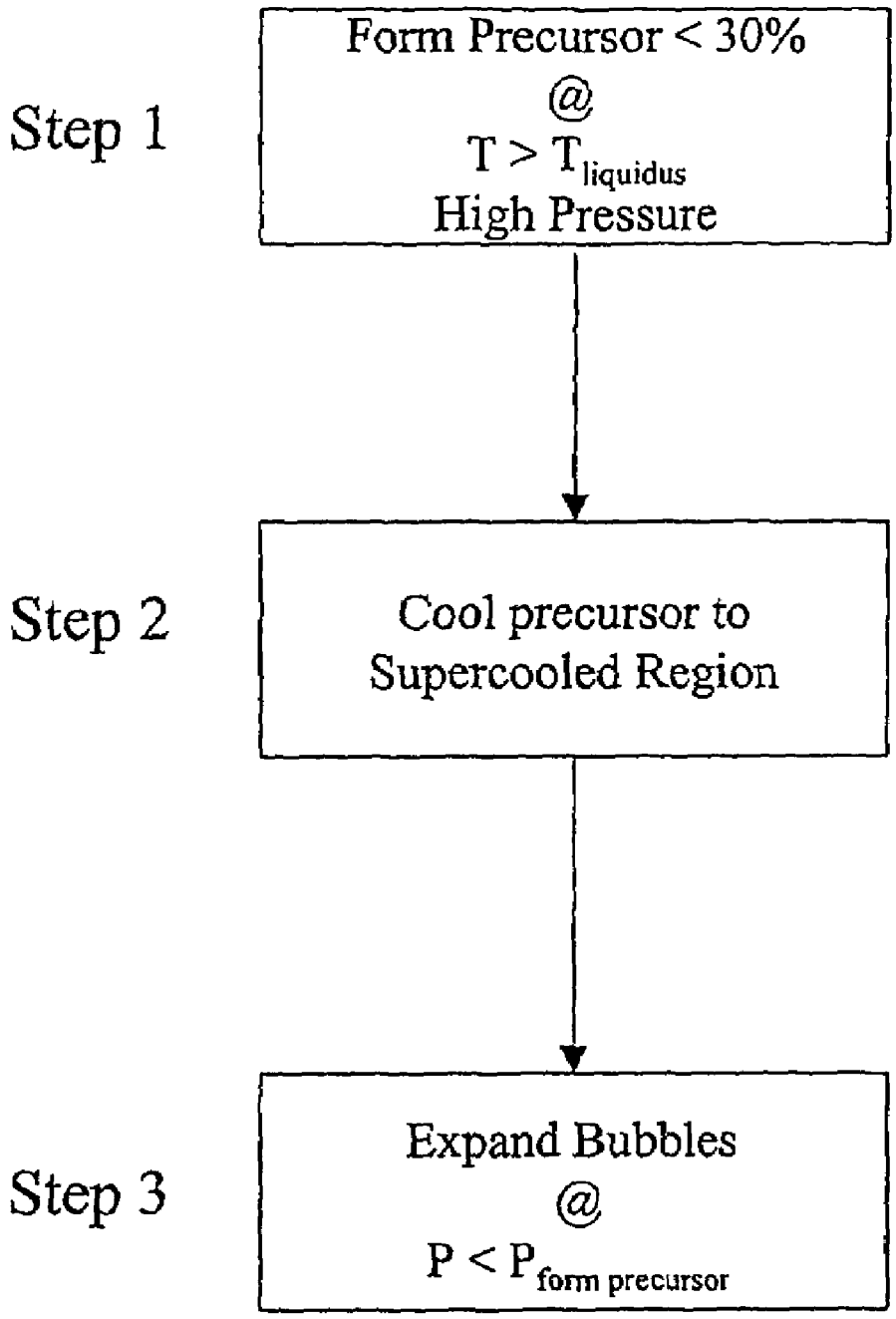
FIG. 3a is a flowchart of a first embodiment of a method of manufacturing amorphous metallic foams according to the current invention.
Figure 3B:
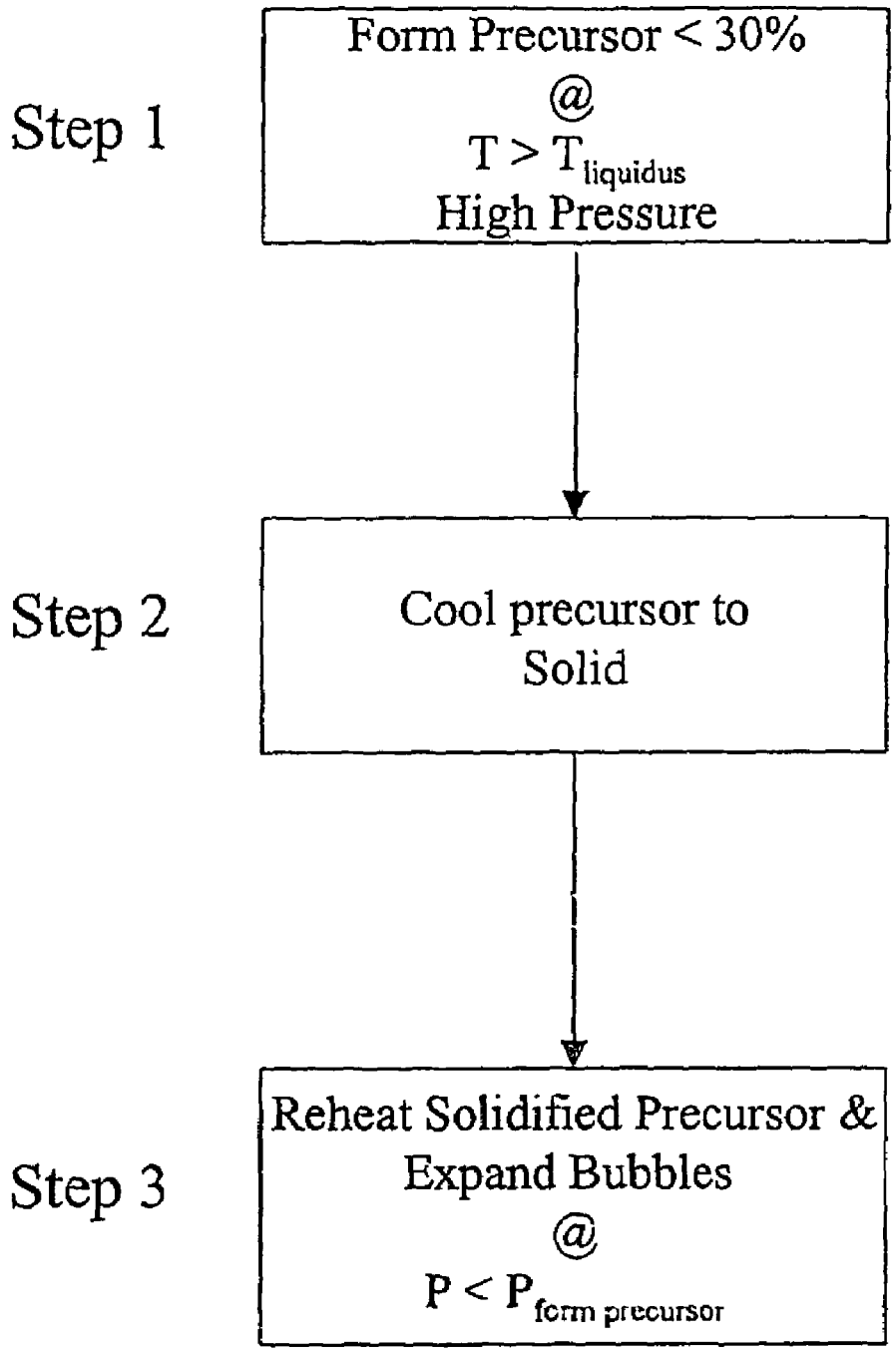
FIG. 3b is a flowchart of a second embodiment of a method of manufacturing amorphous metallic foams according to the current invention.

In one exemplary embodiment, the processing method for making foams from bulk-solidifying amorphous alloy exhibiting a glass transition before crystallization according to the present invention comprises three general steps: 1) creation of a foam precursor by introducing bubbles into the liquid form; 2) cooling the precursor; and 3) expanding the bubbles in the precursor to form a final metallic foam. Flow charts of two embodiments of this general process are shown in FIGS. 3a and 3b. As shown, both methods generally entail the steps as recited below.

First, creating a "precursor" at temperatures above the liquidus temperature of the alloy. The "precursor" itself preferably consists of a moderate volume fraction (<30%) of small bubbles (<1 mm). The method of forming the precursor preferably including creating a large internal bubble pressure in the bubbles by processing the precursor at high pressures (up to ~50 bar or more).

Second, the cooling of the precursor from the molten alloy is done sufficiently quickly to avoid any substantial crystallization and maintain its amorphous state.

Finally, to allow the bubbles in the precursor to expand in the supercooled liquid region of the bulk-solidifying amorphous alloy under a pressure gradient by processing the material at lower pressures than the bubble pressure in step 1 (preferably in partial or full vacuum). The supercooled temperature region is preferably where the viscosity of the alloy is between ~$10^{12}$ Pa·s and ~$10^{6}$ Pa·s. It should be understood that the processing time can be any length such that the material does not crystallize during expansion or that the process is terminated before crystallization would set in, resulting in an amorphous foam.

In the method summarized in FIG. 3a, the precursor is only cooled in the second step to a super-cooled region, shown in the TTT diagram in FIG. 1 as being below the nose of crystallization curve and above the glass transition temperature. Accordingly, in this embodiment, the expansion of the bubbles does not require any reheating of the precursor, but rather controlled cooling of the precursor into specific temperature zones.

Meanwhile, in the method summarized in FIG. 3b, the precursor is cooled to a solidifying temperature (below the glass transition temperature) in Step 2 to form a solid precursor material, and then reheated in Step 3 to above the glass transition temperature to allow for the expansion of the bubbles. This embodiment is preferred for manufacturing arrangements in which it is advantageous to be able to handle a stable precursor prior to the preparation of the final metallic foam.

The expansion of the bubbles, and hence the precursor, can be carried out in any pre-determined constrained geometry in order to achieve near-to-net-shaped foam components. Furthermore, such operation can be carried as a part of the assembly or mechanical joining operation into other materials.

Although the process discussed above is useful for a wide variety of bulk-solidifying amorphous alloys, it should be understood that the precise processing conditions required for any particular bulk-solidifying amorphous alloy will differ. For example, as discussed above, a foam consisting of a liquid metal and gas bubbles is an unstable structure, flotation of the lighter gas bubbles due to gravitational force takes place, leading to a gradient of the bubbles in size and volume. The flotation velocity of a gas bubble in any liquid metal material can be calculated according to the Stoke's law:

$$V_{sed}=2a^2(\rho_l-\rho_g)g/9\eta \quad (1)$$

where g is the gravitational acceleration, a is the bubble radius, and $\rho_l$, $\rho_g$, are the densities of the liquid and gas, respectively.

Figure 4A:
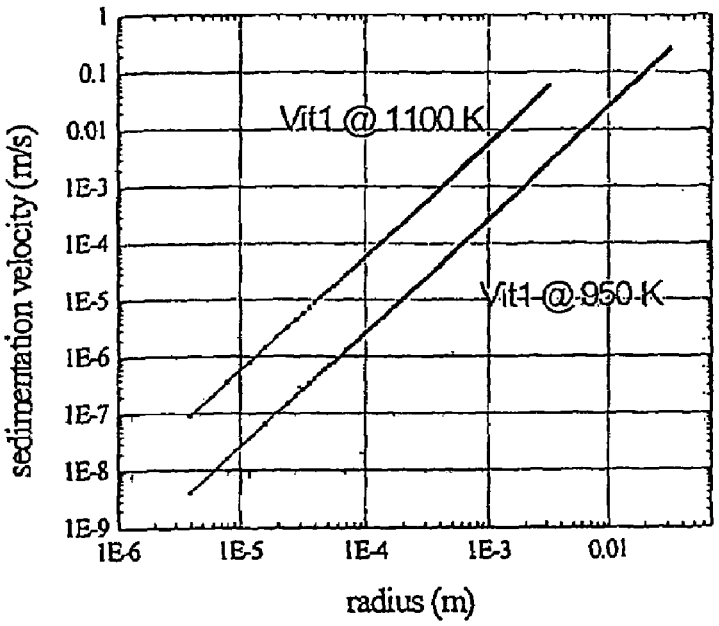
FIG. 4a is a graphical representation of the flotation properties of an embodiment ($Zr_{41}Ti_{14}Cu_{12}Ni_{10}Be_{23}$ (% atom.) called VIT-1) of a suitable material for manufacturing amorphous metallic foams according to the current invention
Figure 4B:
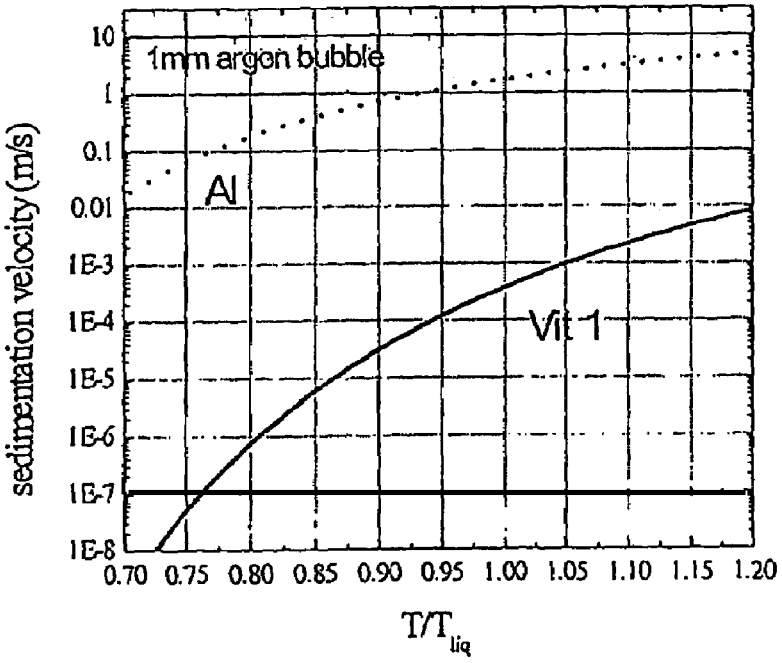
FIG. 4b is a graphical representation of the flotation properties of an embodiment ($Zr_{41}Ti_{14}Cu_{12}Ni_{10}Be_{23}$ (% atom.) called VIT-1) of a suitable material for manufacturing amorphous metallic foams according to the current invention as compared to pure Al metal.

An exemplary flotation velocity calculation made according to Equation 1 for VIT-1 is shown in FIGS. 4a and 4b. As shown in FIG. 4a, using experimental viscosity data (as shown in FIG. 2) and a liquid VIT-1 density of $\rho=6.0\times10^3$ kg/m$^3$, the flotation velocities of bubbles in a VIT-1 alloy melt as a function of bubble radius is calculated for liquid VIT-1 at 950 K (———), and 1100 K (- - -). FIG. 4b shows the flotation for a 1 mm gas bubble in liquid VIT-1 (———) and liquid Al (- - -) as a function of $T/T_1$.

Using such graphs, acceptable processing conditions, such as time and temperature can be determined. For example, if the duration of a typical manufacturing process is taken to be 60 s and an acceptable flotation distance of ~5 mm, processing times and temperatures resulting in a flotation velocity smaller than $10^{-4}$ m/s would be acceptable. Therefore, in this case an unacceptable bubble gradient can be avoided if the maximum bubble size is less than 630 μm if the VIT-1 melt is processed above its liquidus temperature of about 950 K. By processing VIT-1 melts at 660 K, below its crystallization temperature of 675 K, no noticeable flotation takes place even for ~1 cm bubbles. On the other hand, these results show that the formation of gradients in Al-melts cannot be suppressed for bubbles larger than about 4 μm.

The TTT-diagram for VIT-1 also suggests that, for example, at ~700 K it takes 1100 s before the sample crystallizes. This time is available for processing the precursor and expanding the bubbles while avoiding significant crystallization. In FIG. 2 the viscosity of VIT-1 is depicted. In the temperature region where the undercooled liquid is accessible the viscosity is between $10^{12}$ Pa·s and $10^6$ Pa·s. For these viscosity values, bubbles of even several cm in size do not show any noticeable gradient on the time scale of the experiment.

Figure 5A:
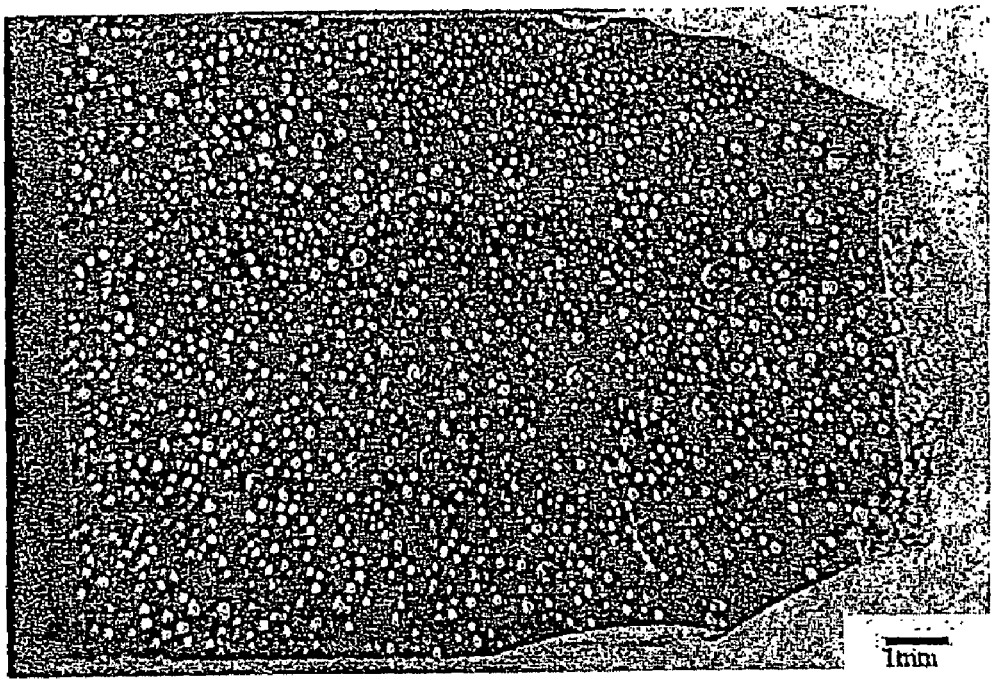
FIG. 5a is a pictorial representation of an embodiment of a solid precursor manufactured according to the current invention.
Figure 5B:
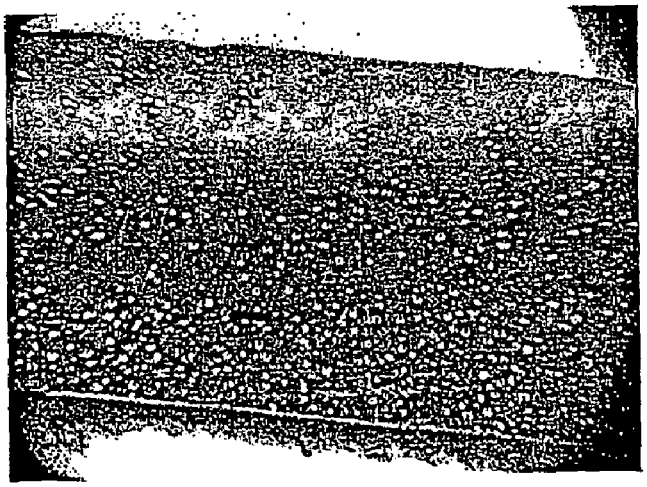
FIG. 5b is a pictorial representation of an embodiment of a solid precursor manufactured according to the current invention.

As discussed above, in order to prepare the precursor, a gas has to be introduced into the liquid bulk-solidifying amorphous alloy. Any suitable method of introducing bubbles in the liquid bulk-solidifying amorphous alloy sample may be utilized in the current invention. In one exemplary embodiment, gas releasing agents, such as $B_2O_3$ can be used which are mixed with the metal alloy. The $B_2O_3$ releases $H_2O_3$ at elevate temperatures, which in turn forms gas bubbles in the size range of from about ~20 μm up to ~2 mm. As already demonstrated in the calculations, with these size bubbles no observable gradient takes place in the final metallic foam. Exemplary foam materials were made using this gradient free process, and are shown in FIGS. 5a and 5b for $B_2O_3$ in a PdNiCuP alloy. These figures also demonstrate how the volume fraction of the gas bubbles can be varied with the processing time, temperature, and pressure between 3% FIG. 5a and 20% FIG. 5b.

Another method to introduce bubbles into a liquid bulk-solidifying amorphous alloy to obtain a precursor foam is by mechanical treating. In such an embodiment, the stability of a liquid surface can be described by comparing the inertial force to the capillary force, according to the ratio:

$$W=\frac{\rho v^2 L}{\sigma} \quad (2)$$

where W is the Weber number, ρ is the density of the liquid, v the velocity of the moving interface, L a typical length for bubble size, and σ the liquid's surface energy. For W<1 the liquid surface becomes unstable and gives rise to mechanically create bubbles in the liquid. This equation makes it possible to calculate the size of bubbles that can be created for a given inertial force and surface energy. For example, an object with a velocity of 10 m/s moving in a liquid with a density of 6.7 g/cm$^3$ and a viscosity of 1 Pa·s is able to break-up bubbles with a size down to 1 μm.

Figure 6:
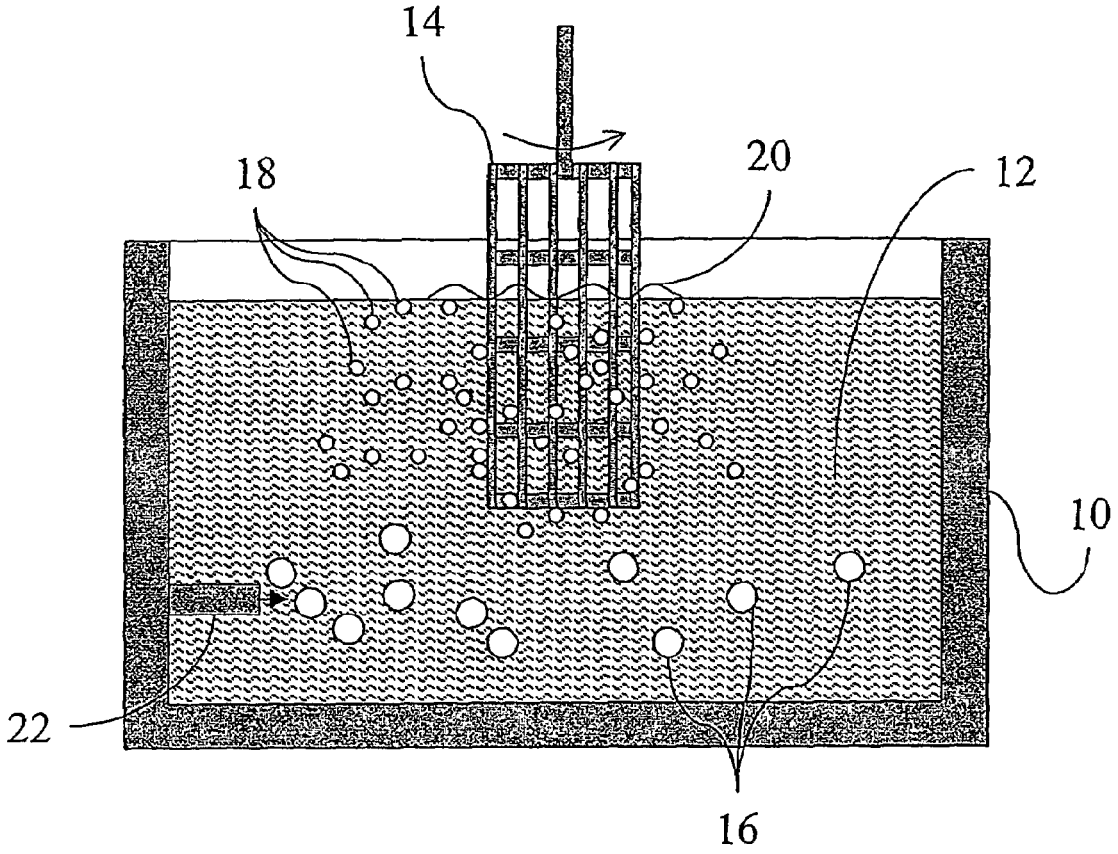
FIG. 6 is a schematic of an embodiment of an apparatus for manufacturing metallic foams according to the current invention.

A schematic of an apparatus capable of creating a precursor according to this method is shown in FIG. 6. In this embodiment, a heated crucible 10 holds the liquid alloy sample 12 and a spinning whisk 14 is used to breakup existing bubbles 16 and create new bubbles 18 by breaking up the surface 20 of the liquid. A bubbler 22, consisting in this embodiment of a tube through which gas may be passed is used to create the initial bubbles. Initial bubbles can also be created through the surface by the drag of the liquid created by the spinning whisk.

Figure 7:
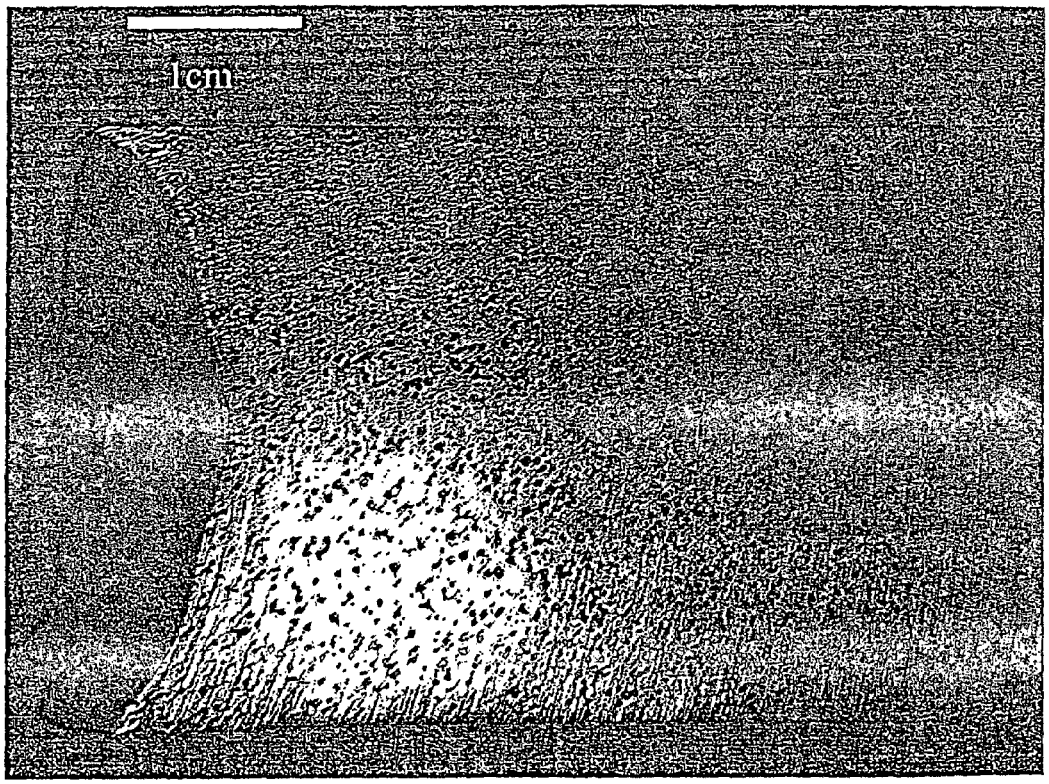
FIG. 7 is a pictorial representation of an embodiment of a solid precursor ($Zr_{58.5}Nb_{2.8}Cu_{15.6}Ni_{12.8}Al_{10.3}$ (% atom.) called VIT-106a) manufactured according to the current invention.

An example of a Vitreloy 106 precursor made in accordance with this mechanical method is shown in FIG. 7. The precursor consists of about 10% bubbles. The bubble size is in between 0.020 mm and 1 mm.

It should be noted that there is a minimum bubble size that can be created with the precursor-forming methods. From the energy considerations, it can be derived that the minimum bubble size, which is given by:

$$Rmin=2Sigma/P \quad (3)$$

where sigma is the (surface tension) (as in the above Weber equation), and P is the ambient pressure during bubble creation. It should be noted the bubble size in the foam precursor are preferably as small as possible in order to obtain a better controlled expansion in the subsequent steps. According to the above formula, a high ambient pressure (up to 50 bars or more) is desired during bubble formation in order to create bubbles in smaller diameters.

The invention is directed to methods of achieving a high degree of homogeneity in bubble distribution in the foam precursor (which in itself can be used a metallic foam material). Nonetheless, the very same foam precursor can be formed into a final foam material of lower density (a higher volume fraction of bubbles), and with a high degree of homogeneity in bubble distribution by utilizing the above-mentioned expansion steps for the foam precursor with homogeneous bubble distribution.

In such an embodiment, a first steady-state bubble distribution is achieved with one of the above processes of bubble generation. This is followed by flotation of larger bubbles by keeping the molten alloy above the liquidus. Since large bubbles float much faster than small bubbles do (see eq. 1) the bubble size distribution can be narrowed simply by letting the bubbles float. If no new bubbles are generated during this step the bubble size distribution shifts towards smaller bubbles and narrows. Accordingly, the specific temperature above the liquidus can be selected by the desire bubble size distribution. The higher the temperature above the liquidus, the faster the shift to smaller bubble sizes and narrowing in the distribution happens Furthermore, after the undesired larger size bubbles are floated, the molten alloy can be homogenized by a controlled mechanical operation without trapping additional bubbles, for example by submerging the whole whisk into the molten alloy. Accordingly, a new bubble distribution can be achieved with a tighter distribution of smaller bubbles. The above-mentioned steps can be repeated several times in order to achieve the desired distribution of bubble size.

Although the viscosity properties of bulk-solidifying amorphous alloys make it possible to controllably create precursors and prevent serious spatial gradient in bubble distribution, in conventional bulk-solidifying amorphous alloy processing techniques it is critical in the subsequent solidification that the temperature of the foam be controlled to ensure that substantial crystallization is avoided and the amorphous structure of the material is maintained. As a result, this requires cooling the foam material at a rate higher than the critical cooling rate, where the critical cooling rate, $R_c$, is defined as the lowest cooling rate at which significant crystallization of the material can be avoided upon cooling. In turn, $R_c$ is inversely proportional to the critical casting thickness, $D_c$.

Accordingly, an alloy containing bubbles has a smaller critical casting thickness than the same alloy without any bubbles. Accordingly, the influence of the foaming process on the critical casting thickness, assuming the foaming process does not cause heterogeneous nucleation, can be estimated through the increase in thermal diffusion length. For example, if $\alpha_g \ll \alpha_l$ (where $\alpha$ is the thermal conductivity of the g (gas), and l (liquid)), $\rho_g \ll \rho_l$, (where $\rho$ is the density), and $c_{p,g} \leq c_{p,l}$ (where $c_p$ is the specific heat), the heat will predominately transfer through the liquid. But this requires an increased diffusion length since the linear path is interrupted. Assuming a dense packing of spherically shaped, uniform bubbles, with a volume fraction of about 75%, the additional diffusion length can be calculated by comparing the length of going around a bubble with the bubble diameter, resulting in a factor of $\pi/2$. This results in a decrease in the effective thermal conductivity and gives a critical casting thickness for the foam which is 65% of that of the bulk material. Accordingly, amorphous foam containing 75% bubbles manufactured by this method would be restricted in one dimension to a thickness $D_c$ (bulk)×0.65.

However, in the technique of the present invention the smallest dimension of the foam is not limited to the Dc of the bulk materials. Specifically, in the first step in the processing route according to the present invention an amorphous foam "precursor" consisting of a large number of small bubbles (sized between ~10 μm and ~1 mm) with a maximum volume fraction of 30% is formed. The critical casting thickness of the precursor would be about $D_c$ (bulk)×0.8 or larger due to the smaller volume fraction of gas than in the above discussed case with 75% bubbles. This precursor will then subsequently be expanded in the super-cooled liquid region. Here, such restrictions of critical casting thickness do not apply. Instead, the dimensions of the final foam is limited by the number and size of the bubbles, the pressure difference in the step 1 and step 3.

In order to expand the bubbles in the precursor in the super-cooled liquid region, a difference in pressure inside the bubbles and the pressure in the undercooled liquid is mandatory. Therefore, this processing step has to be performed at a lower pressure than that used in Step 1. The expansion time and temperature can be calculated from the growth of a gas bubble in a liquid according to Equation 4, below.

$$\frac{dR}{dt} = \left(P_B(R) - P - \frac{2\sigma}{R}\right)\frac{R}{4\eta} \tag{4}$$

where R is the bubble radius, R; interfacial energy, σ, viscosity, η, pressure in the bubble, $P_B$; and the pressure outside the bubble, P.

Figure 8:
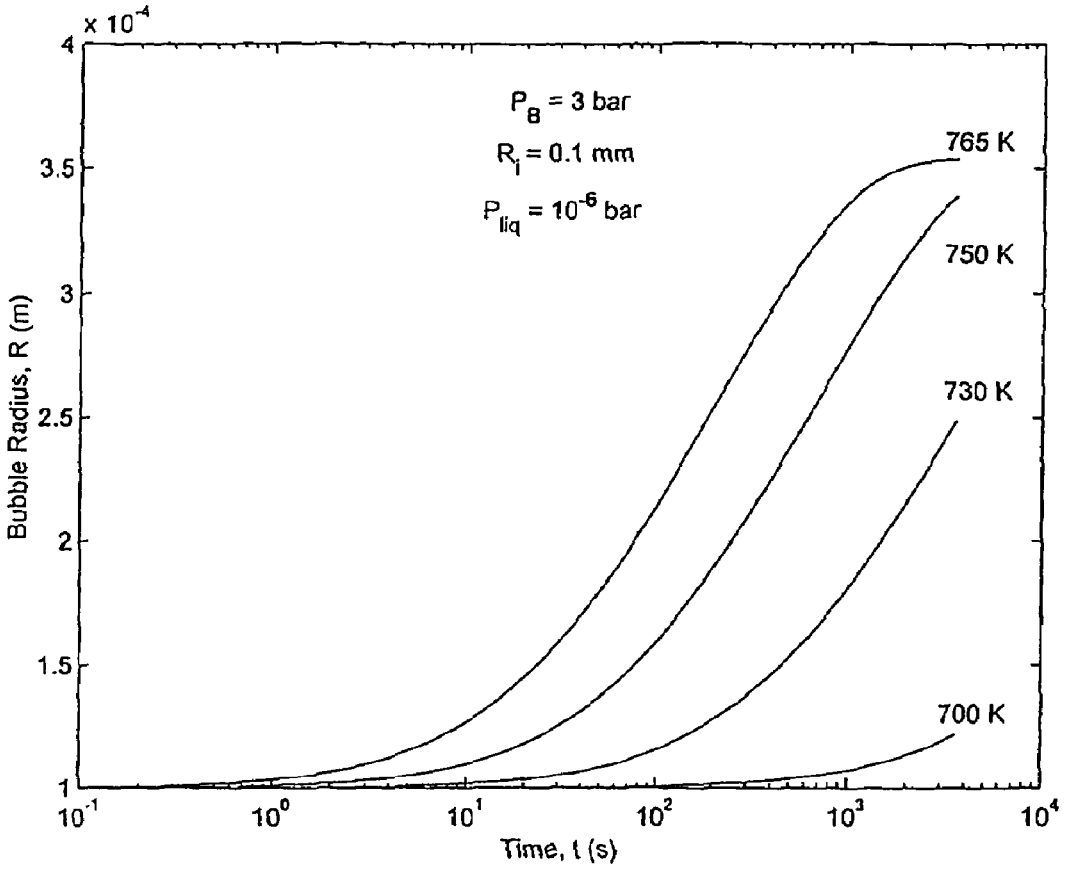
FIG. 8 is a graphical representation of the expansion behavior of the precursor into a foam at different temperatures ($Zr_{58.5}Nb_{2.8}Cu_{15.6}Ni_{12.8}Al_{10.3}$ (% atom.) called VIT-106a) of a suitable material for manufacturing metallic foams according to the current invention.

FIG. 8 shows the expanding bubble radius of VIT-106a ($Zr_{58.5}Nb_{2.8}Cu_{15.6}Ni_{12.8}Al_{10.3}$% atomic) as a function of time for different temperatures for a pressure of 3 bar in the bubble and $10^{-6}$ bar in the liquid. The initial bubble radius is 100 μm. Taken from FIG. 1 the time to reach crystallization, which is the available time for the foaming process one can calculate the maximum bubble volume fraction for different precursor. This is done for the considered temperatures in FIG. 8, namely 700 K, 730 K, 750 K, and 765 K for a bubble pressure of 3 bar and a liquid pressure of $10^{-6}$ bar for an initial bubble radius of 100 μm. These results are also summarized in Table 1, below. For example, a precursor that consists of 10% bubbles, processed at 750 K for the available time of 110 s, expands to a bubble volume fraction of 47% and maintains its amorphous structure.

TABLE 1

Bubble Expansion Versus Time

| T [K] | T cryst [s] | 5% % bubble | 10% % bubble | 20% % bubble |
|---|---|---|---|---|
| 700 | 3700 | 9 | 18 | 33 |
| 730 | 420 | 15 | 27 | 45 |
| 750 | 110 | 30 | 47 | 67 |
| 765 | 85 | 33 | 51 | 70 |

Figure 9:
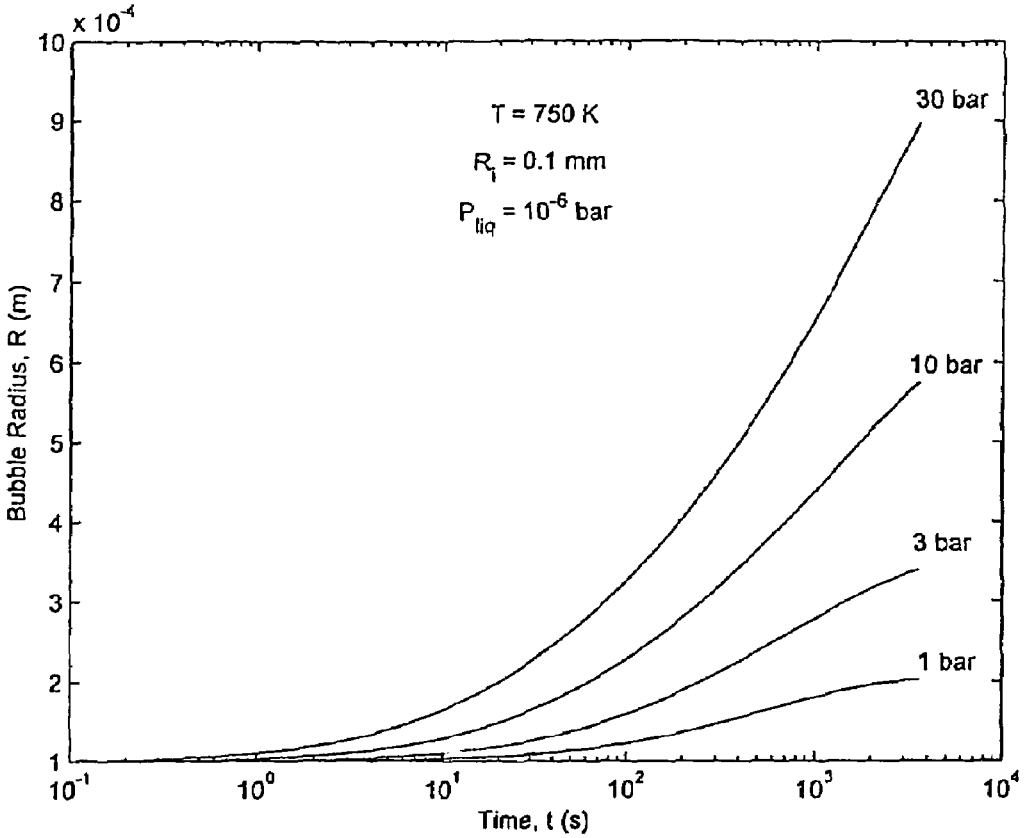
FIG. 9 is a graphical representation of the expansion behavior of the solid precursor into a foam at different pressures ($Zr_{58.5}Nb_{2.8}Cu_{15.6}Ni_{12.8}Al_{10.3}$ (% atom.) called VIT-106a) of a suitable material for manufacturing metallic foams according to the current invention.

FIG. 9 shows the influence of the bubble pressure on the expansion. The processing temperature is 750 K, the initial bubble radius is 100 μm, and the pressure in the liquid during expansion is $10^{-6}$ bar. Table 2 shows the expansion of precursors with 5%, 10%, 20% for bubble pressures of 1 bar, 3 bar, 10 bar, and 30 bar. Especially at high bubble pressure the precursor can be substantially expanded within the time before crystallization sets in.

TABLE 2

Bubble Expansion Versus Pressure

| T [K] | P [bar] | 5% % bubble | 10% % bubble | 20% % bubble |
|---|---|---|---|---|
| 750 | 1 | 13 | 23 | 41 |
| 750 | 3 | 30 | 47 | 67 |
| 750 | 10 | 53 | 71 | 85 |
| 750 | 30 | 77 | 88 | 95 |

EXAMPLE 1

A low density amorphous PdNiCuP was made by mixing ingots of the PdNiCuP with hydrated $B_2O_3$. The $B_2O_3$ releases gas at temperatures around the melting temperature of the alloy and creates a large number of small bubbles. The mixture of PdNiCuP and $B_2O_3$ is processed for 1200 s at 1200 K. The bubble containing liquid is then cooled with a rate that prevents detectable crystallization. The amorphous structure was confirmed by differential scanning calorimetry (DSC).

Figure 10:
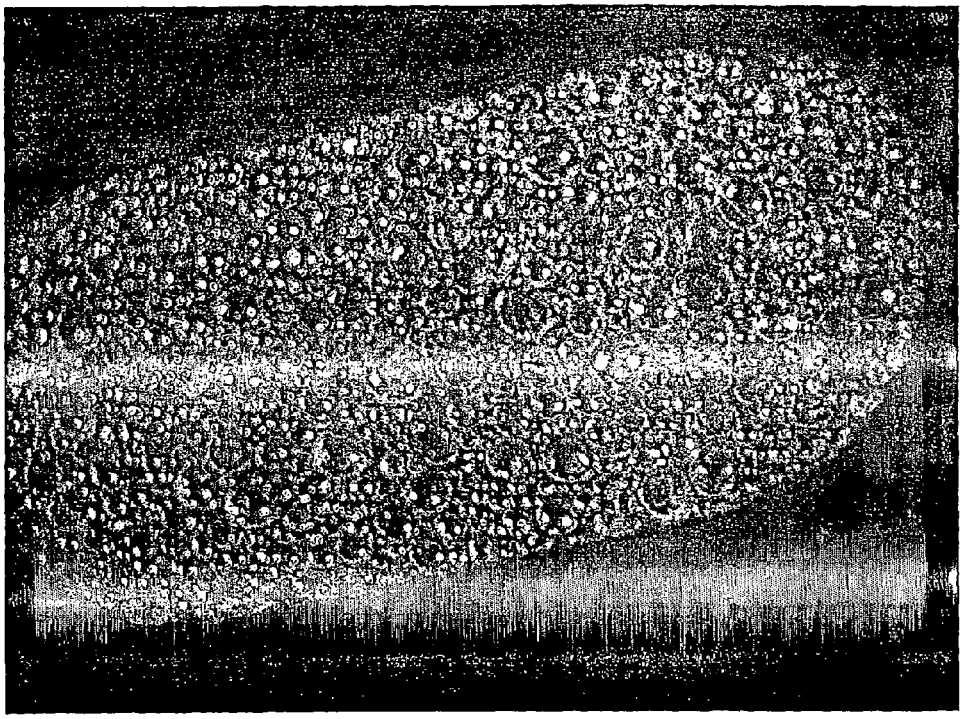
FIG. 10 is a pictorial representation of an embodiment of an amorphous metallic foam manufactured according to the current invention.

The bubble volume fraction of the precursor is between 10 and 20% (see FIG. 5a and FIG. 5b). The amorphous precursor was subsequently heated up in the supercooled liquid region to a temperature of 360 C and held there for 120 s. The pressure was decreased to about $10^{-3}$ mbar. During this time the precursor expands. FIG. 10 shows the resulting foam. The density is $2.2\times10^3$ kg/m$^3$ compare to $9.1\times10^3$ kg/m$^3$ of the bulk PdNiCuP sample. This results in a bubble volume fraction of about 75%. DSC measurements on the foamed sample showed that no noticeable crystallization took place during the expansion process.

EXAMPLE 2

Another technique to produce a precursor is to mechanically create bubbles in the liquid by air entrapment. The setup shown in FIG. 6 is used to create the precursor foam. The setup comprises a molybdenum brush of 3-cm diameter spinning at speeds of up to 2500 rpm. This results in relative velocities between the liquid and brush of up to 3 m/s. Small bubbles are then created in the liquid sample which is sitting in a graphite crucible that is inductively heated by either entrapping gas through the surface, or by releasing gas through a bubbler positioned underneath the whisk. In the mechanical air entrapment technique, bubbles are created as a consequence of induced Rayleigh-Taylor instabilities. The Weber number is a dimensionless scaling number that scales inertia forces to surface tension forces. It is defined as:

$$we=(density)u^2R/sigma$$

where u is the relative velocity between liquid and brush and $\sigma$ is the liquid-gas surface tension. When We>1, inertial forces exceed interfacial tension forces and consequently an interfacial instability is generated by which air gets entrapped in the liquid.

The Weber number can be employed to calculate the size of bubbles that can be created by considering that stable bubbles can be formed when We>1. Using typical values for density and surface tension as $\rho$=6500 kg/m$^3$ and $\sigma$=1 N/m and a relative velocity of 3 m/s, the smallest stable bubble radius that can be created with this parameters is ~20 microns. A $Zr_{58.5}Nb_{2.8}Cu_{15.6}Ni_{12.8}Al_{10.3}$ prefoam synthesized by the mechanical air entrapment method is shown in FIG. 7. The prefoam consists of 10-vol % bubbles with an average size of 250 microns. The spatial distribution of bubbles appears to be very uniform, which implies that sedimentation was negligible during processing. Furthermore the size distribution of bubbles appears fairly narrow.

The preceding description has been presented with reference to presently preferred embodiments of the invention. Workers skilled in the art and technology to which this invention pertains will appreciate that alterations and changes in the described structures and processes may be practiced without meaningfully departing from the principal, spirit and scope of this invention.

Accordingly, the foregoing description should not be read as pertaining only to the precise structures described and illustrated in the accompanying drawings, but rather should be read consistent with and as support to the following claims which are to have their fullest and fair scope.

What is claimed is:

1. A method of manufacturing a metallic foam from a bulk-solidifying amorphous alloy comprising:

providing a molten bulk-solidifying amorphous alloy;

introducing a plurality of gas bubbles, to the molten alloy at a temperature about the liquidus temperature of the alloy to form a precursor at a first pressure such that the bubbles are formed with a specified internal bubble pressure;

holding the conditions of the precursor after introduction of the plurality of gas bubbles steady for a specified period of time such that a proportion of the plurality of bubbles above a chosen size threshold are removed from the molten precursor via flotation such that the bubble size distribution within the precursor is at least partially homogenized;

at least partially cooling the precursor to a processing temperature below the nose of the crystallization curve of the alloy and above the glass transition temperature of the alloy at a cooling rate such that the molten alloy substantially maintains its amorphous state; and expanding the bubbles in the precursor while the precursor is at the processing temperature by providing a pressure gradient to the precursor where the pressure during the expansion is lower than the internal bubble pressure of the introduced gas bubbles formed during the precursor forming step.

2. The method of claim 1, further comprising quenching the expanded precursor after expanding the bubbles, where the quenching is conducted at a cooling rate such that the at least a partial amorphous atomic structure is formed in the metallic foam object.

3. The method according to claim 1, wherein the precursor is cooled to below the glass transition temperature sufficiently fast to form a solidified precursor material with substantially amorphous atomic structure, and further comprising heating the solid precursor material into the super-cooled region of the bulk-solidifying amorphous alloy above the glass transition temperature of the alloy and below the nose of the crystallization curve of the alloy to expand the bubbles.

4. The method according to claim 1, wherein the temperature of the precursor is reduced to within the supercooled region of the bulk solidifying amorphous alloy during cooling sufficiently fast to avoid any substantial crystallization.

5. The method according to claim 1, wherein the gas bubbles are mechanically generated in the molten alloy.

6. The method according to claim 1, wherein the gas bubbles are introduced to the molten alloy through in gas form through a nozzle.

7. The method according to claim 1, wherein the gas bubbles are introduced to the molten alloy by adding [an] *a* gas releasing agent to the molten alloy.

8. The method according to claim 1, wherein a volume fraction of <30% of the plurality of bubbles have sizes between 1 μm and 1 mm.

9. The method according to claim 1, wherein at least 50% by volume of the metallic foam has an amorphous atomic structure.

10. The method according to claim 1, further including regulating the process parameters during the expansion in accordance with a calculated size dependent flotation velocity of the bubbles as given by the equation:

$$V_{sed}=2a^2[\rho l-\rho_g]g/9\rho$$

to control the homogeneity, size and volume distribution of the bubbles in the precursor.

11. The method according to claim 1, wherein the step of introducing gas bubbles to form the precursor occurs at a pressure of about 50 bar or more.

12. The method according to claim 1, wherein the precursor is maintained within a temperature range such that the precursor has a viscosity of about $10^6$ Pa·s to $10^{12}$ Pa·s during the expanding step.

13. The method according to claim 1, wherein the expansion of the precursor is carried out in one of either a mold or a cast.

14. The method according to claim 1, wherein the bubbles of the metallic foam have a size distribution of from about 1 μm to about 10 μm.

15. The method according to claim 1, wherein the bulk solidifying amorphous alloy is a Zr-base amorphous alloy.

16. The method according to claim 1, wherein the bulk solidifying amorphous alloy has a ΔT of at least 60° C.

17. The method according to claim 1, wherein the bulk solidifying amorphous alloy is an Fe-base amorphous alloy.

18. The method according to claim 1, wherein the plurality of bubbles is one of either close or open celled.

*19. A method comprising:*

*introducing gas bubbles to an alloy in a molten form at a temperature about a liquidus temperature of the alloy at a first pressure to form a precursor;*

*removing a proportion of the gas bubbles above a chosen size threshold such that a size distribution of the bubbles within the precursor is at least partially homogenized;*

*cooling at least a portion of the precursor such that the alloy substantially maintains an amorphous state; and*

*expanding the bubbles in the precursor to form a foam comprising the alloy substantially in the amorphous state.*

*20. The method of claim 19, further comprising quenching the expanded precursor after expanding the bubbles, where the quenching is conducted at a cooling rate such that an at least partially amorphous atomic structure is formed in the metallic foam object.*

*21. The method according to claim 19, wherein the precursor is cooled to below the glass transition temperature sufficiently fast to form a solidified precursor material with a substantially amorphous atomic structure, and further comprising heating the solid precursor material into the supercooled region of the bulk-solidifying amorphous alloy above the glass transition temperature of the alloy and below the nose of the crystallization curve of the alloy to expand the bubbles.*

*22. The method according to claim 19, wherein the gas bubbles are introduced to the molten alloy by adding a gas releasing agent to the molten alloy.*

*23. The method according to claim 19, wherein the bubbles have a size distribution of from about 1 μm to about 10 μm.*

*24. The method according to claim 19, wherein the bulk solidifying amorphous alloy is a Zr-based amorphous alloy or a Fe-based amorphous alloy.*

*25. The method of claim 19, wherein the precursor has a pore size distribution of between 1 μm and 10 μm.*

*26. The method of claim 25, wherein the pore size distribution is homogeneous.*

*27. The method of claim 19, wherein the precursor comprises less than 30% by volume of gas bubbles below a chosen size threshold such that a size distribution of the bubbles within the precursor is substantially homogeneous.*

*28. The method of claim 19, wherein the precursor comprises metallic foam.*

*29. The method of claim 28, wherein the metallic foam has a smaller casting thickness than the bulk-solidifying amorphous alloy without any bubbles.*

* * * * *